US012586922B2

(12) United States Patent
Araki et al.

(10) Patent No.: US 12,586,922 B2
(45) Date of Patent: Mar. 24, 2026

(54) INTELLIGENT REFLECTING SURFACE

(71) Applicant: Japan Display Inc., Tokyo (JP)

(72) Inventors: Shigesumi Araki, Tokyo (JP); Shinichiro Oka, Tokyo (JP); Mitsutaka Okita, Tokyo (JP); Daiichi Suzuki, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 48 days.

(21) Appl. No.: 18/804,145

(22) Filed: Aug. 14, 2024

(65) Prior Publication Data

US 2024/0405441 A1 Dec. 5, 2024

Related U.S. Application Data

(63) Continuation of application No. PCT/JP2023/007788, filed on Mar. 2, 2023.

(30) Foreign Application Priority Data

Mar. 17, 2022 (JP) ................................. 2022-042989

(51) Int. Cl.
*H01Q 15/14* (2006.01)

(52) U.S. Cl.
CPC ................................. *H01Q 15/148* (2013.01)

(58) Field of Classification Search
CPC ...... H01Q 15/148; H01Q 17/001; H01Q 3/44; H01Q 3/46; H01Q 15/14
See application file for complete search history.

(56) References Cited

U.S. PATENT DOCUMENTS

2015/0346557 A1* 12/2015 Lee .................. G02F 1/133753 438/30
2018/0083364 A1* 3/2018 Foo .................... H01Q 15/0026
2024/0322429 A1* 9/2024 Suzuki ................. H01Q 15/148

FOREIGN PATENT DOCUMENTS

JP H11-103201 A 4/1999
JP 2019-530387 A 10/2019

OTHER PUBLICATIONS

International Search Report and Written Opinion mailed on May 16, 2023, received for PCT Application No. PCT/JP2023/007788, filed on Mar. 2, 2023, 09 pages including English Translation.

* cited by examiner

*Primary Examiner* — David E Lotter
(74) *Attorney, Agent, or Firm* — XSENSUS LLP

(57) ABSTRACT

Disclosed is an intelligent reflecting surface including a plurality of radio-wave reflecting devices, an adjusting substrate over the plurality of radio-wave reflecting devices, and an anti-reflective film located over the adjusting substrate and configured to absorb radio waves. Each of the plurality of radio-wave reflecting devices includes a pair of substrates and a plurality of radio-wave reflecting elements between the pair of substrates. The anti-reflective film has a lattice shape as a whole. An edge is covered by the anti-reflective film and a portion surrounded by the edge is exposed from the anti-reflective film in each of the plurality of radio-wave reflecting devices. A frequency of the radio waves is equal to or greater than 400 MHz and equal to or less than 50 GHz, for example.

15 Claims, 17 Drawing Sheets

INTELLIGENT REFLECTING SURFACE

CROSS-REFERENCE TO RELATED APPLICATIONS

This application is a Continuation of International Patent Application No. PCT/JP2023/007788, filed on Mar. 2, 2023, which claims the benefit of priority to Japanese Patent Application No. 2022-042989, filed on Mar. 17, 2022, the entire contents of each are incorporated herein by reference.

FIELD

An embodiment of the present invention relates to an intelligent reflecting surface.

BACKGROUND

Since liquid crystal molecules have an anisotropic dielectric constant, the dielectric constant of a liquid crystal layer can be controlled by adjusting an electric field applied to the liquid crystal layer containing liquid crystal molecules to control the orientation of the liquid crystal molecules. For example, Japanese Patent Applications No. H11-103201 and 2019-530387 disclose meta-surfaces having characteristics which can be controlled by adjusting the electric field applied to the liquid crystal layer. The application of these techniques enables the construction of an intelligent reflecting surface effective for radio waves with a wide range of wavelengths.

SUMMARY

An embodiment of the present invention is an intelligent reflecting surface. The intelligent reflecting surface includes a plurality of radio-wave reflecting devices, an adjusting substrate over the plurality of radio-wave reflecting devices, and an anti-reflective film located over the adjusting substrate and configured to absorb radio waves. Each of the plurality of radio-wave reflecting devices includes a pair of substrates and a plurality of radio-wave reflecting elements between the pair of substrates. The anti-reflective film has a lattice shape as a whole. In each of the plurality of radio-wave reflecting devices, an edge is covered by the anti-reflective film, and a portion surrounded by the edge is exposed from the anti-reflective film.

An embodiment of the present invention is a manufacturing method of an intelligent reflecting surface. The manufacturing method includes: arranging a plurality of radio-wave reflecting devices in a matrix shape; arranging an adjusting substrate over the plurality of radio-wave reflecting devices; and arranging an anti-reflective film over the adjusting substrate. Each of the plurality of radio-wave reflecting devices includes a pair of substrates and a plurality of radio-wave reflecting elements between the pair of substrates. The anti-reflective film has a lattice shape as a whole. The anti-reflective film is arranged so that an edge is covered by the anti-reflective film and a portion surrounded by the edge is exposed from the anti-reflective film in each of the plurality of radio-wave reflecting devices.

DESCRIPTION OF EMBODIMENTS

Hereinafter, each embodiment of the present invention is explained with reference to the drawings. The invention can be implemented in a variety of different modes within its concept and should not be interpreted only within the disclosure of the embodiments exemplified below.

The drawings may be illustrated so that the width, thickness, shape, and the like are illustrated more schematically compared with those of the actual modes in order to provide a clearer explanation. However, they are only an example, and do not limit the interpretation of the invention. In the specification and the drawings, the same reference number is provided to an element that is the same as that which appears in preceding drawings, and a detailed explanation may be omitted as appropriate.

In the specification and the claims, unless specifically stated, when a state is expressed where a structure is arranged "over" another structure, such an expression includes both a case where the substrate is arranged immediately above the "other structure" so as to be in contact with the "other structure" and a case where the structure is arranged over the "other structure" with an additional structure therebetween.

In the specification and the claims, an expression "a structure is exposed from another structure" means a mode in which a part of the structure is not covered by the other structure and includes a mode where the part uncovered by the other structure is further covered by another structure. In addition, a mode expressed by this expression includes a mode where a structure is not in contact with other structures.

An embodiment of the present embodiment is an intelligent reflecting surface having a function of reflecting applied radio waves in arbitral directions. There are no restrictions on the frequencies of radio waves which can be reflected. For example, the frequency of radio waves may be in a range equal to or greater than 400 MHZ and equal to or less than 50 GHz, where the intelligent reflecting surface typically reflects radio waves in a 400 MHz to 6.0 GHz band, a 2.5 GHz to 4.7 GHz band, and a 24 GHz to 50 GHz band. The intelligent reflecting surface according to an embodiment of the present invention may be used as a reflector for radio waves with a frequency greater than 50 GHz.

1. Overall Structure

Figure 1:
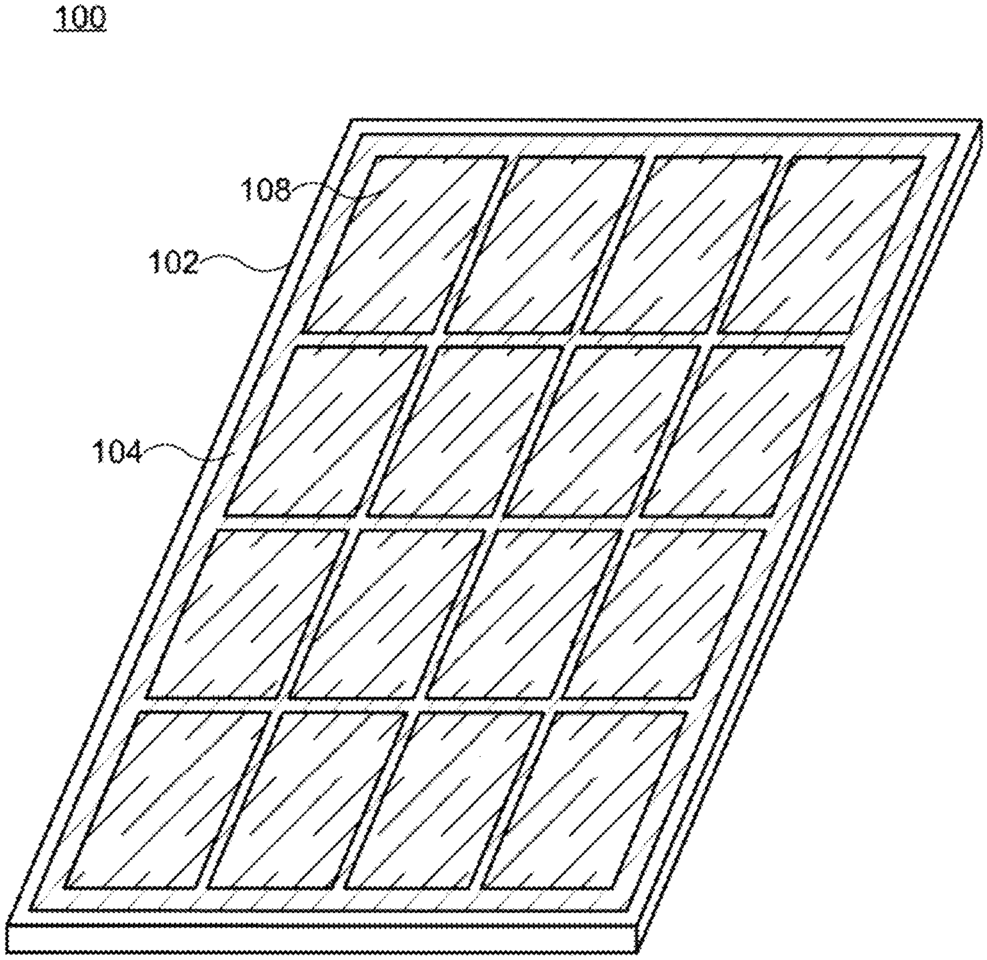
FIG. 1 is a schematic perspective view of an intelligent reflecting surface according to an embodiment of the present invention.
Figure 2:
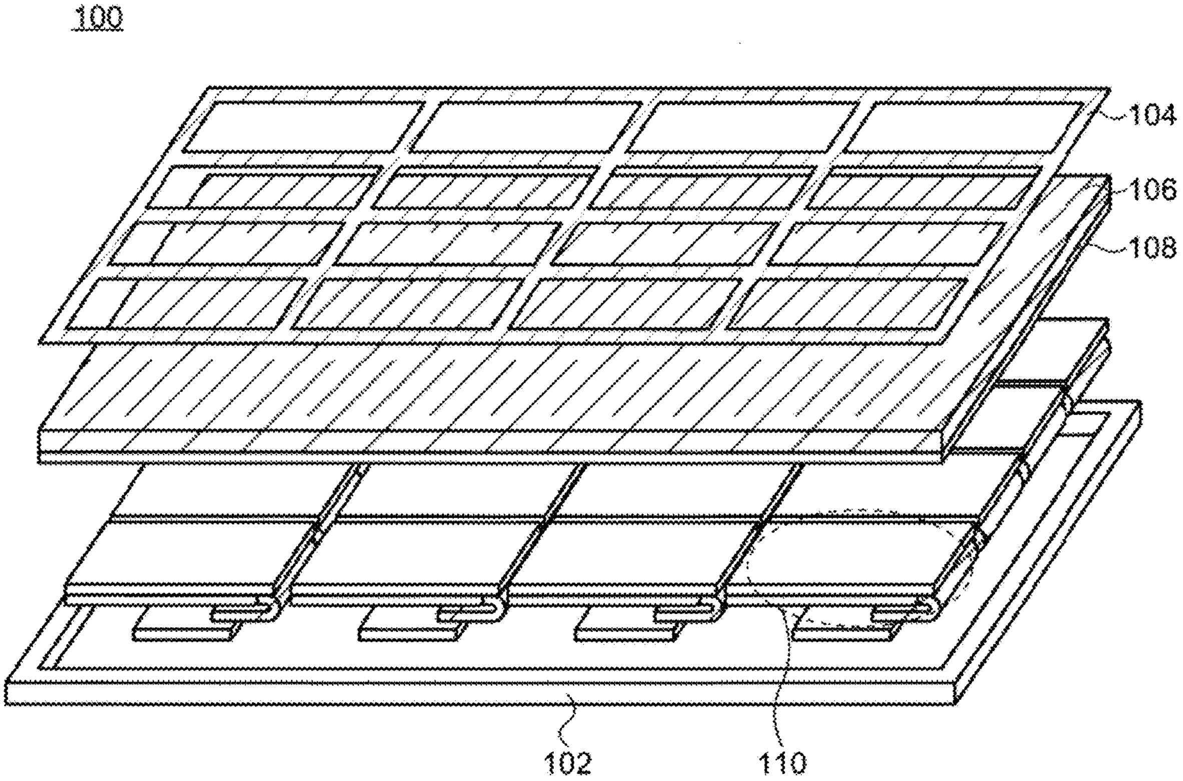
FIG. 2 is a schematic developed view of an intelligent reflecting surface according to an embodiment of the present invention.

Schematic perspective and developed views of the intelligent reflecting surface are respectively shown in FIG. 1 and FIG. 2. As shown in these drawings, the intelligent reflecting surface 100 includes, as the basic components thereof, a plurality of radio-wave reflecting devices 110, an adjusting substrate 106 over the plurality of radio-wave reflecting devices 110, and an anti-reflective film 104 over the adjusting substrate 106. The adjusting substrate 106 and the anti-reflective film 104 are arranged to overlap the plurality of radio-wave reflecting devices 110. The intelligent reflecting surface 100 may further include a housing 102 and an adhesive layer 108. Hereinafter, each component will be described below, where a view obtained from the anti-reflective film 104 side is defined as a top view, and a view obtained from an opposite side of the anti-reflective film (a view obtained from the radio-wave reflecting device 110 side) is defined as a bottom view in the drawings attached to the specification. For convenience, the anti-reflective film 104 side is defined as the upper side, while the radio-wave reflecting device 110 side is defined as the lower side.

2. Housing

Figure 3A:
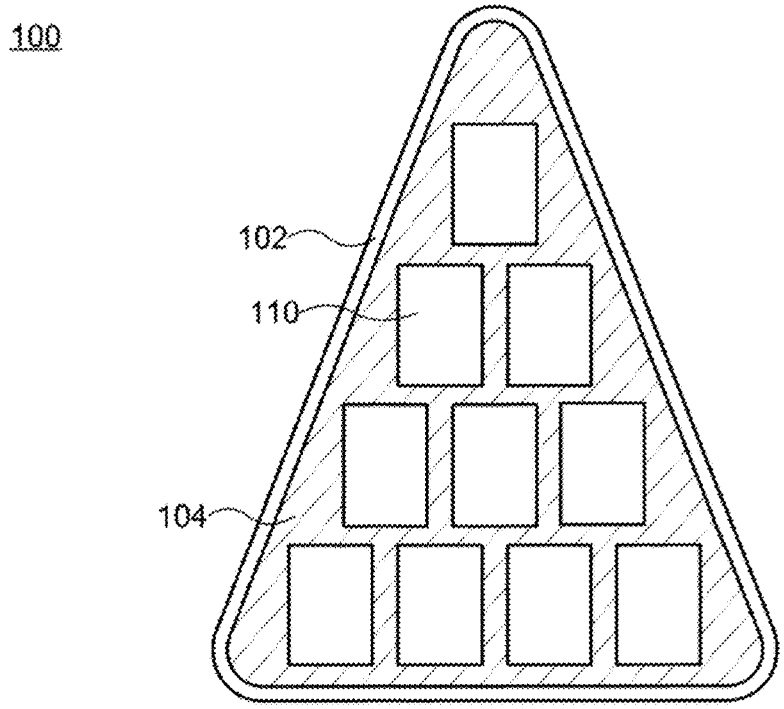
FIG. 3A is a schematic top view of an intelligent reflecting surface according to an embodiment of the present invention.
Figure 3B:
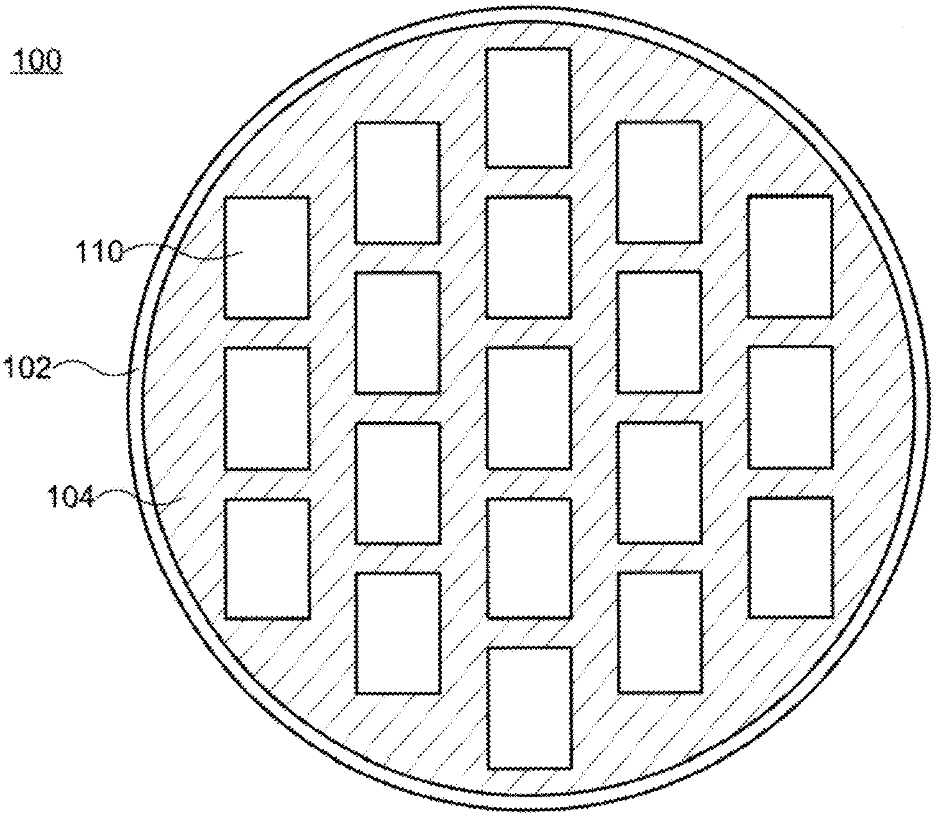
FIG. 3B is a schematic top view of an intelligent reflecting surface according to an embodiment of the present invention.

As shown in FIG. 1 and FIG. 2, the housing 102 is positioned under the plurality of radio-wave reflecting devices 110 and is configured to accommodate the plurality of radio-wave reflecting devices 110. The radio-wave reflecting devices 110 are arranged so as not to overlap one another within the housing 102. The housing 102 is a container including a metal, a resin, or wood, and at least a portion of its top surface is opened to expose the plurality of radio-wave reflecting devices 110 from the housing 102. The shape of the housing 102 is not limited to a rectangle as shown in FIG. 1 and may be triangular as shown in FIG. 3A or circular as shown in FIG. 3B. The shape of the housing 102 may be selected from a variety of polygons including triangles and quadrilaterals and may also be an ellipse. In addition, the contour of the housing 102 may also be composed of straight and curved lines. There are also no restrictions on the arrangement of the radio-wave reflecting devices 110 within the housing 102, and the radio-wave reflecting devices 110 may be arranged in a matrix shape composed of a plurality of rows and a plurality of columns as shown in FIG. 1 and FIG. 2, for example. In the example shown in FIG. 1, the plurality of radio-wave reflecting devices 110 is arranged in a matrix shape with four rows and four columns.

3. Radio-Wave Reflecting Device (1) Structure

Figure 4:
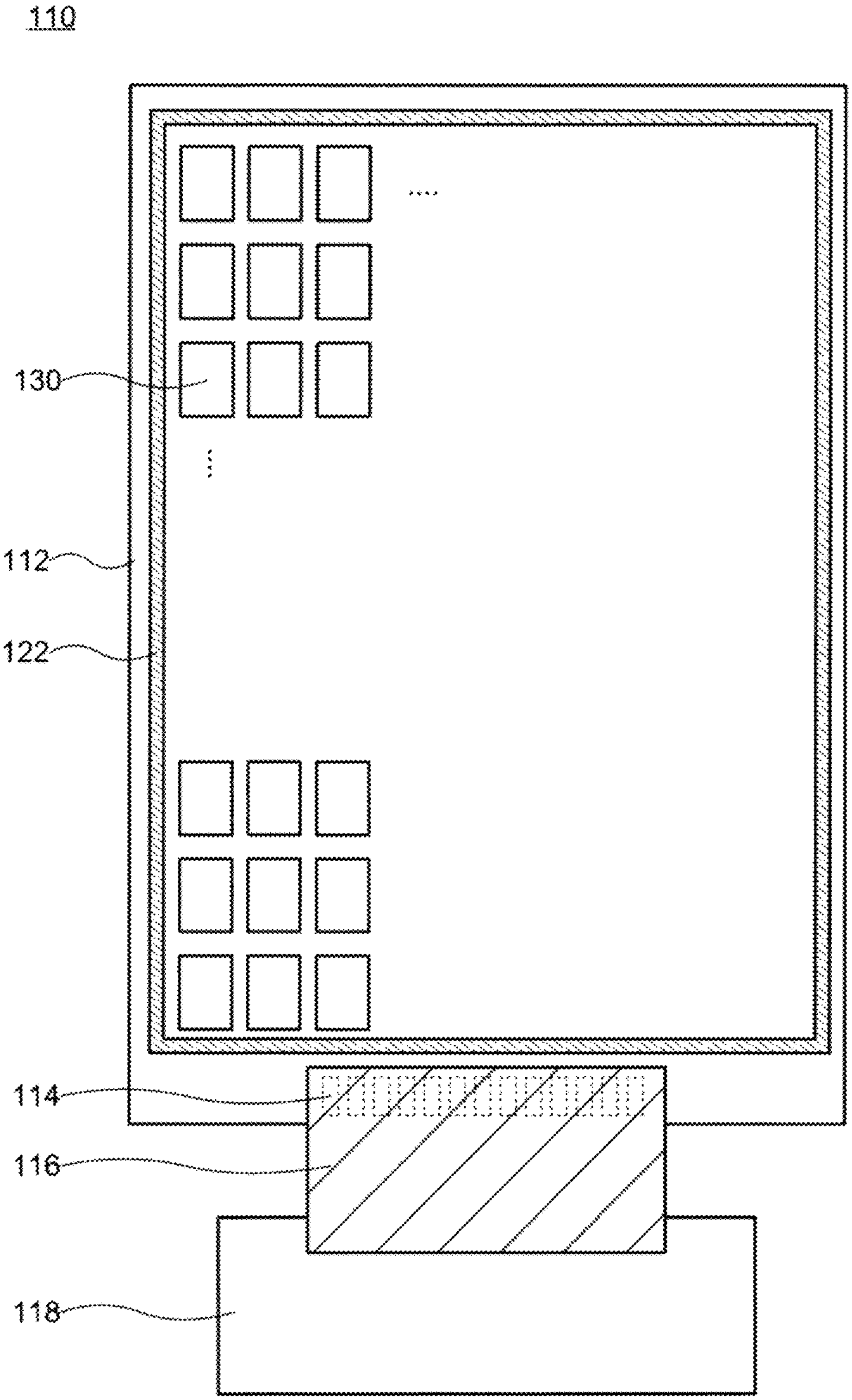
FIG. 4 is a schematic bottom view of a radio-wave reflecting device included in an intelligent reflecting surface according to the present invention.

A schematic bottom view of each radio-wave reflecting device 110 is shown in FIG. 4. The radio-wave reflecting device 110 has a pair of substrates (only one substrate (second substrate 112) is shown in FIG. 4), and a plurality of radio-wave reflecting elements 130 is arranged in a matrix shape with a plurality of rows and a plurality of columns between these substrates. The number of radio-wave reflecting elements 130 is not restricted, and the number of rows and columns is arbitrarily set and may be identical to or different from each other. The surface formed by the arrangement of the plurality of radio-wave reflecting elements 130, i.e., a single area (reflective region) simultaneously encompassing all of the radio-wave reflecting elements 130, may be square, rectangular, or circular. Preferably, the reflective region has one or a plurality of symmetry axes traversing the reflective region.

The pair of substrates including the second substrate 112 is secured to each other by a sealing material 122 containing a resin such as an epoxy resin and an acrylic resin. A liquid crystal layer 140 described later is sealed in the space formed by the pair of substrates and the sealing material 122. A wiring (not illustrated) extending from each of the radio-wave reflecting elements 130 is formed over the second substrate 112, and the wiring is exposed at an edge portion of the second substrate 112 to form a terminal 114. The terminals 114 are connected to a driver circuit mounted over a printed circuit board 118 with a connector 116 such as a flexible printed circuit (FPC) board. This structure allows signals and power for controlling the radio-wave reflecting elements 130 to be supplied from the driver circuit to the radio-wave reflecting elements 130 via the connector 116. Within the housing 102, the connector 116 is folded and arranged so that the second substrate 112 and a printed circuit board 118 overlap each other (see FIG. 2). This arrangement allows for a high-density arrangement of the radio-wave reflecting elements 130 within the housing 102.

(2) Radio-Wave Reflecting Element

Figure 5:
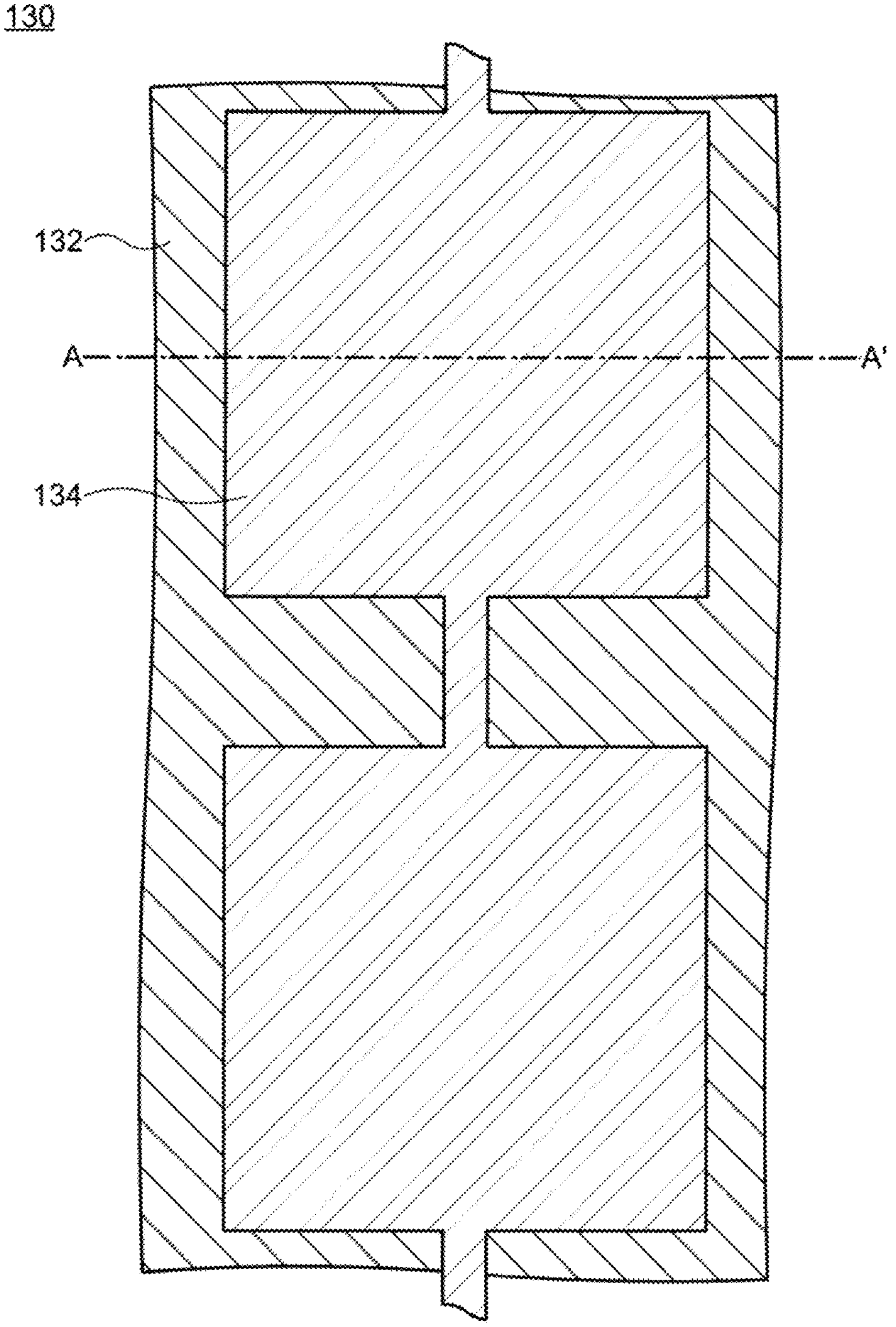
FIG. 5 is a schematic top view of a radio-wave reflecting element of a radio-wave reflecting device included in an intelligent reflecting surface according to the present invention.
Figure 6:
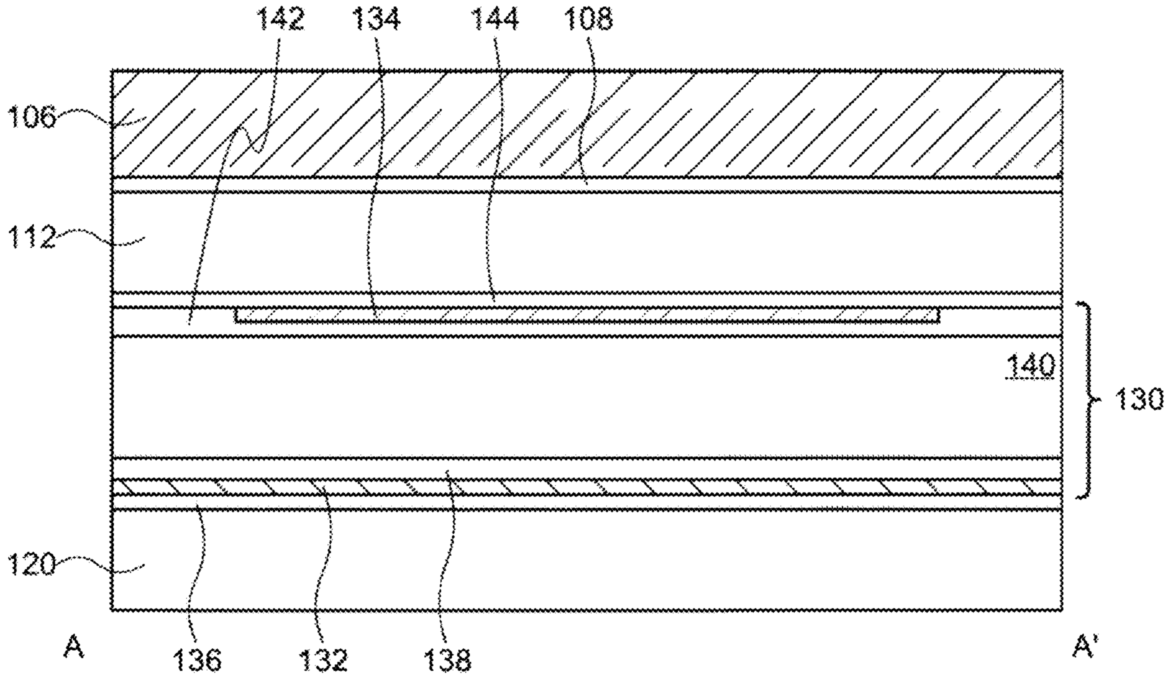
FIG. 6 is a schematic cross-sectional view of a radio-wave reflecting element of a radio-wave reflecting device included in an intelligent reflecting surface according to the present invention.

A schematic top view of the radio-wave reflecting elements 130 is shown in FIG. 5, and a schematic cross-sectional view along the chain line A-A' in FIG. 5 is shown in FIG. 6. Two adjacent radio-wave reflecting elements 130 are illustrated in FIG. 5. As can be understood from FIG. 5 and FIG. 6, each radio-wave reflecting element 130 is provided between the pair of substrates, i.e., the first substrate 120 and the second substrate 112. Each radio-wave reflecting element 130 has a first electrode (also referred to as a common electrode) 132 and a second electrode (also referred to as a patch electrode) 134 facing each other 132 and sandwiched between the first substrate 120 and the second substrate 112, between which a first orientation film 138, a second orientation film 142, and the liquid crystal layer 140 injected between the first orientation film 138 and the second orientation film 142 are disposed. For visibility, only the first electrode 132 and the second electrode 134 are illustrated in FIG. 5.

The first substrate 120 and the second substrate 112 are provided to provide physical strength to the radio-wave reflecting device 110 and to provide a surface to arrange the radio-wave reflecting elements 130 and the wirings. The first substrate 120 and/or the second substrate 112 may be flexible. The first substrate 120 and the second substrate 112 may include an inorganic insulator such as glass or quartz, a semiconductor such as silicon, a polymer such as a polyimide, a polycarbonate, and a polyester, and a metal such as aluminum, copper, and stainless steel. When a conductive material such as a metal is included in the first substrate 120 and/or the second substrate 112, it is preferred that the surfaces over which the radio-wave reflecting elements 130 are provided, i.e., the second substrate 112 side of the first substrate 120 and the first substrate 120 side of the second substrate 112, be respectively coated with protective films 136 and 144 containing one or a plurality of films including a silicon-containing inorganic compound such as silicon oxide and silicon nitride. Since a film containing a silicon-containing inorganic compound has high blocking properties against impurities, the formation of the protective films 136 and 144 prevents impurities such as a metal ion and water contained in the first substrate 120 and the second substrate 112 from entering the radio-wave reflecting elements 130 even if the first substrate 120 and the second substrate 112 contain glass or a polymer.

Hereinafter, the structure of the radio-wave reflecting element 130 is described in detail.

(a) First Electrode

The first electrode 132 is provided over the first substrate 120. As described above, the first electrode 132 may be formed over the first substrate 120 through the protective film 136 which is an optional component. As shown in FIG. 5, the first electrode 132 may be provided over all of the radio-wave reflecting elements 130 in each radio-wave reflecting device 110. That is, the first electrode 132 may be provided to be shared by all of the radio-wave reflecting elements 130. The first electrode 132 is supplied with a constant potential from the driver circuit over the printed circuit board 118 via the terminal 114.

The first electrode 132 may contain a metal such as copper, aluminum, tungsten, molybdenum, and titanium, an alloy containing at least one of these metals, or a conductive oxide such as indium-tin oxide (ITO) and indium-zinc oxide (IZO). The first electrode 132 may also have a monolayer structure or a stacked-layer structure with stacked layers of different compositions. The first electrode 132 may be formed by applying a sputtering method, a chemical vapor deposition (CVD) method, or the like.

(b) First Orientation Film and Second Orientation Film

The first orientation film 138 and the second orientation film 142 are provided to control the orientation of the liquid crystal molecules structuring the liquid crystal layer 140 provided therebetween. The first orientation film 138 is disposed over the first electrode 132 and covers the first electrode 132. Similarly, the second orientation film 142 is also provided under the second electrode 134 so as to overlap the second electrode 134. The first orientation film 138 and the second orientation film 142 are continuously provided over the plurality of radio-wave reflecting elements 130. In other words, the first orientation film 138 and the second orientation film 142 are not divided between adjacent radio-wave reflecting elements 130, but are shared by all of the radio-wave reflecting elements 130. The first orientation film 138 and the second orientation film 142 each include a polymer such as a polyimide and a polyester and are formed by utilizing a wet deposition method such as an ink jet method, a spin coating method, a printing method, and a dip coating method. The surfaces of the first orientation film 138 and the second orientation film 142 are subjected to a rubbing treatment. The direction of the rubbing treatment (rubbing direction) is the same between the first orientation film 138 and the second orientation film 142. The rubbing direction is an orientation direction of an orientation film and is the direction in which the long axes of liquid crystal molecules are oriented when the liquid crystal molecules are in contact with the orientation film.

(c) Liquid Crystal Layer

The liquid crystal layer 140 contains the liquid crystal molecules. The structure of the liquid crystal molecules is not limited. Thus, the liquid crystal molecules may be nematic liquid crystals, smectic crystals, cholesteric crystals, or chiral smectic liquid crystals.

The liquid crystal layer 140 is injected into the space formed by the first substrate 120, the second substrate 112, and the sealing material 122 and is in direct contact with the first orientation film 138 and the second orientation film 142. The thickness of the liquid crystal layer 140 is, for example, equal to or greater than 20 μm and equal to or less than 100 μm or equal to or greater than 30 μm and equal to or less than 50 μm. Accordingly, the height of the sealing material 122 is also selected from this range. Although not illustrated, spacers may be provided in the liquid crystal layer 140 to maintain this thickness throughout the entire intelligent reflecting surface 100. If the thickness of the liquid crystal layer 140 described above is employed in a liquid crystal display device, the high responsiveness required for displaying moving images cannot be obtained, and it becomes significantly difficult to express the functions of a liquid crystal display device.

(d) Second Electrode

The second electrode 134 is provided over the second substrate 112 (under the second substrate 112 in FIG. 6). As an optional component, the second electrode 134 may be formed over the second substrate 112 through the protective film 144. As shown in FIG. 5, the second electrodes 134 of the radio-wave reflecting elements 130 adjacent to each other in the column direction or the row direction are electrically connected to and conductive with each other in the radio-wave reflecting device 110. Thus, for example, the second electrodes 134 of the plurality of radio-wave reflecting elements 130 arranged in one column are conductive and equipotential with each other, but these second electrodes 134 are not conductive with the second electrodes 134 of the radio-wave reflecting elements 130 arranged in other columns in this case. Similarly, when the second electrodes 134 of the plurality of radio-wave reflecting elements 130 arranged in one row are conducted to and equipotential with each other, these second electrodes 134 are not conductive with the second electrodes 134 of the radio-wave reflecting elements 130 arranged in other rows.

Similar to the first electrode 132, the second electrode 134 includes a metal such as copper, aluminum, tungsten, molybdenum, and titanium, an alloy containing at least one of these metals, or a conductive oxide such as indium-tin oxide (ITO) and indium-zinc oxide (IZO). The second electrode 134 may also have a monolayer structure or a stacked-layer structure in which layers of different compositions are stacked. The second electrode 134 may also be formed by applying a sputtering method, a CVD method, or the like.

In the aforementioned example, the first electrode 132 provided with a common potential across the plurality of radio-wave reflecting elements 130 is arranged on the first substrate 120 side, and the second electrodes 134 provided with the same potential for each row or column are arranged on the second substrate 112 side. However, the first electrode 132 provided with a common potential across the plurality of radio-wave reflecting elements 130 may be disposed on the second substrate 112 side, and the second electrodes 134 provided with the same potential for each row or column may be disposed on the first substrate 120 side.

(e) Adjusting Substrate

The adjusting substrate 106 is provided over the second substrate 112 either directly or via the adhesive layer 108 (see FIG. 2.). A material contained in the adhesive layer 108 is exemplified by a polymer such as an epoxy resin and an acrylic resin. The adjusting substrate 106 includes, for example, an inorganic compound such as glass and quartz or a polymer such as a polyimide, a polyamide, and a polycycloolefin. As described in detail below, the radio waves incident on the intelligent reflecting surface 100 sequentially pass through the adjusting substrate 106 and the second substrate 112 and reach the radio-wave reflecting elements 130. When the liquid crystal layer 140 is driven to change the dielectric constant thereof, the phase of the radio waves reflected by the radio-wave reflecting elements 130 changes, resulting in a change in the travelling direction of the applied radio waves. This mechanism allows the intelligent reflecting surface 100 to reflect radio waves at a reflection angle different from an incident angle. At this time, in order to prevent loss of radio-wave strength by allowing the incident radio waves and the reflected radio waves to mutually interfere with each other and to more efficiently reflect the radio waves, the thicknesses and the refractive indices of the adjusting substrate 106, the adhesive layer 108, and the second substrate are adjusted so that the optical distance of the adjusting substrate 106, the adhesive layer 108, and one of the pair of substrates closer to the adjusting substrate 106 (i.e., the second substrate 112) is ¼±20% of the wavelength λ of the incident radio waves. Specifically, the thicknesses and refractive indices of the adjusting substrate 106, the adhesive layer 108, and the second substrate 112 are adjusted so that the sum of the products of the refractive indices and thicknesses of the adjusting substrate 106, the adhesive layer 108, and the second substrate 112 is ¼±20% of the wavelength λ of the incident radio waves. Thus, the following equation is satisfied. Here $t_1$, $t_2$, and $t_3$ are the thicknesses of the adjusting substrate 106, the second substrate 112, and the adhesive layer 108, respectively, and $n_1$, $n_2$, and $n_3$ are the refractive indices of the adjusting substrate 106, the second substrate 112, and the adhesive layer 108 with respect to the radio waves of wavelength λ, respectively.

$$\lambda/4\times 0.8\le\sum_{i=1}^{3}t_i n_i\le\lambda/4\times 1.2$$

The refractive index n is expressed by the following equation, where $\varepsilon_0$ and $\mu_0$ are the dielectric constant and the magnetic permeability of the vacuum, respectively, and & and u are the dielectric constant and the magnetic permeability of the material, respectively.

$$n=\sqrt{\frac{\epsilon\mu}{\epsilon_0\mu_0}}$$

Therefore, the above equation for wavelength can be expressed as follows. Here, $\varepsilon_1$, $\varepsilon_2$, and $\varepsilon_3$ are the dielectric constants of the adjusting substrate 106, the second substrate 112, and the adhesive layer 108, respectively, and $\mu_1$, $\mu_2$, and $\mu_3$ are the magnetic permeability of the adjusting substrate 106, the second substrate 112, and the adhesive layer 108, respectively.

$$\lambda/4\times 0.8\le\sum_{i=1}^{3}t_i\sqrt{\frac{\epsilon_i\mu_i}{\epsilon_0\mu_0}}\le\lambda/4\times 1.2$$

However, when adhesive layer 108 is not used, there is no contribution of the adhesive layer 108. In addition, since the refractive index of the adhesive layer 108 is lower than those of the adjusting substrate 106 and the second substrate 112 and its thickness is relatively small, this contribution may be ignored even when the adhesive layer 108 is used. Therefore, the thicknesses and refractive indices (i.e., those of the materials contained therein) of the adjusting substrate 106 and the second substrate 112 may be adjusted so that the sum of the optical distances of the adjusting substrate 106 and the second substrate 112 is ¼±20% of the wavelength λ of the incident radio wave. In this case, the thicknesses, the dielectric constants, and the magnetic permeabilities of the adjusting substrate 106 and the second substrate 112 are controlled so that the following equation is satisfied.

$$\lambda/4\times 0.8\le\sum_{i=1}^{2}t_i\sqrt{\frac{\epsilon_i\mu_i}{\epsilon_0\mu_0}}\le\lambda/4\times 1.2$$

Hence, when the structure of the radio-wave reflecting device 110 is fixed, the material of the second substrate 112 is also fixed. Therefore, highly efficient reflection is possible by selecting the dielectric constant and the magnetic permeability of the adjusting substrate 106 (i.e., the material of the adjusting substrate 106) as well as the thickness thereof according to the wavelength of the reflected radio waves.

(f) Anti-Reflecting Film

Figure 7:
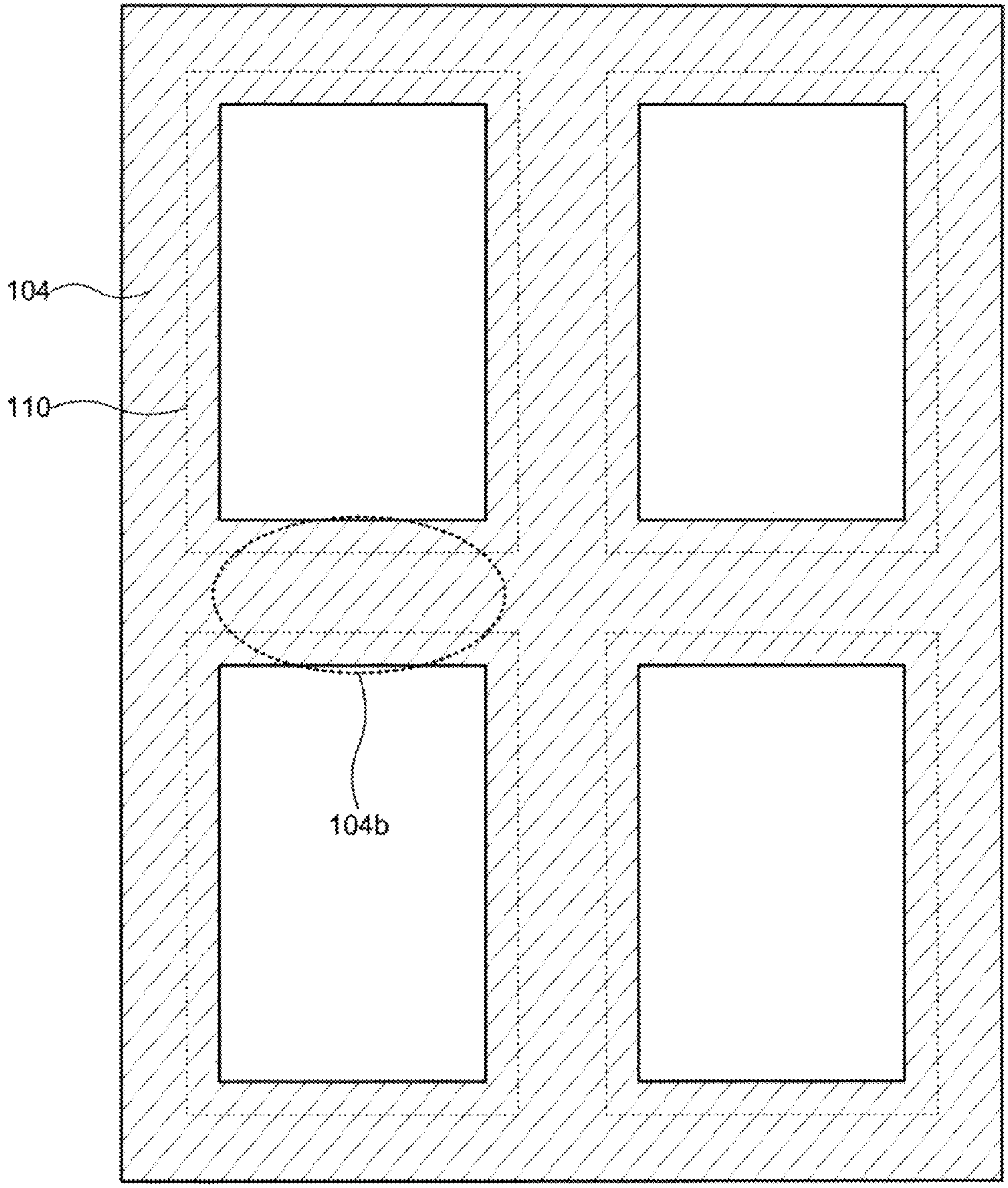
FIG. 7 is a schematic top view of a portion of an intelligent reflecting surface according to the present invention.

The anti-reflective film 104 has a function to prevent diffuse reflection of radio waves between adjacent radio-wave reflecting devices 110 and eliminate the influence on the reflected waves and is configured to absorb radio waves incident on the intelligent reflecting surface 100. As shown in FIG. 1, FIG. 2, and FIG. 7, the anti-reflective film 104 is provided over the adjusting substrate 106 and covers the edge portion of each radio-wave reflecting device 110. In each radio-wave reflecting device 110, the periphery edge is covered by the anti-reflective film 104, and the portion surrounded by the anti-reflective film 104 is exposed from the anti-reflective film 104. Furthermore, the anti-reflective 104 is provided so as to overlap the region between adjacent radio-wave reflecting devices 110. Thus, the anti-reflective film 104 has a lattice shape as a whole.

A radio-wave absorbing film absorbing radio waves and converting the radio waves into heat energy may be used as the anti-reflective film 104, for example. Specifically, a resin film in which metal powder, powder of a magnetic material such as ferrite, carbon black powder, or the like is dispersed is represented. In this case, the anti-reflective film 104 may be fabricated as a continuous film covering the edge portion of each of the plurality of radio-wave reflecting devices 110 and having openings overlapping the portion of each radio-wave reflecting device 110 other than the aforementioned edge portion. The radio-wave absorbing film may be formed, for example, by applying a paint containing the aforementioned powder.

Figure 8:
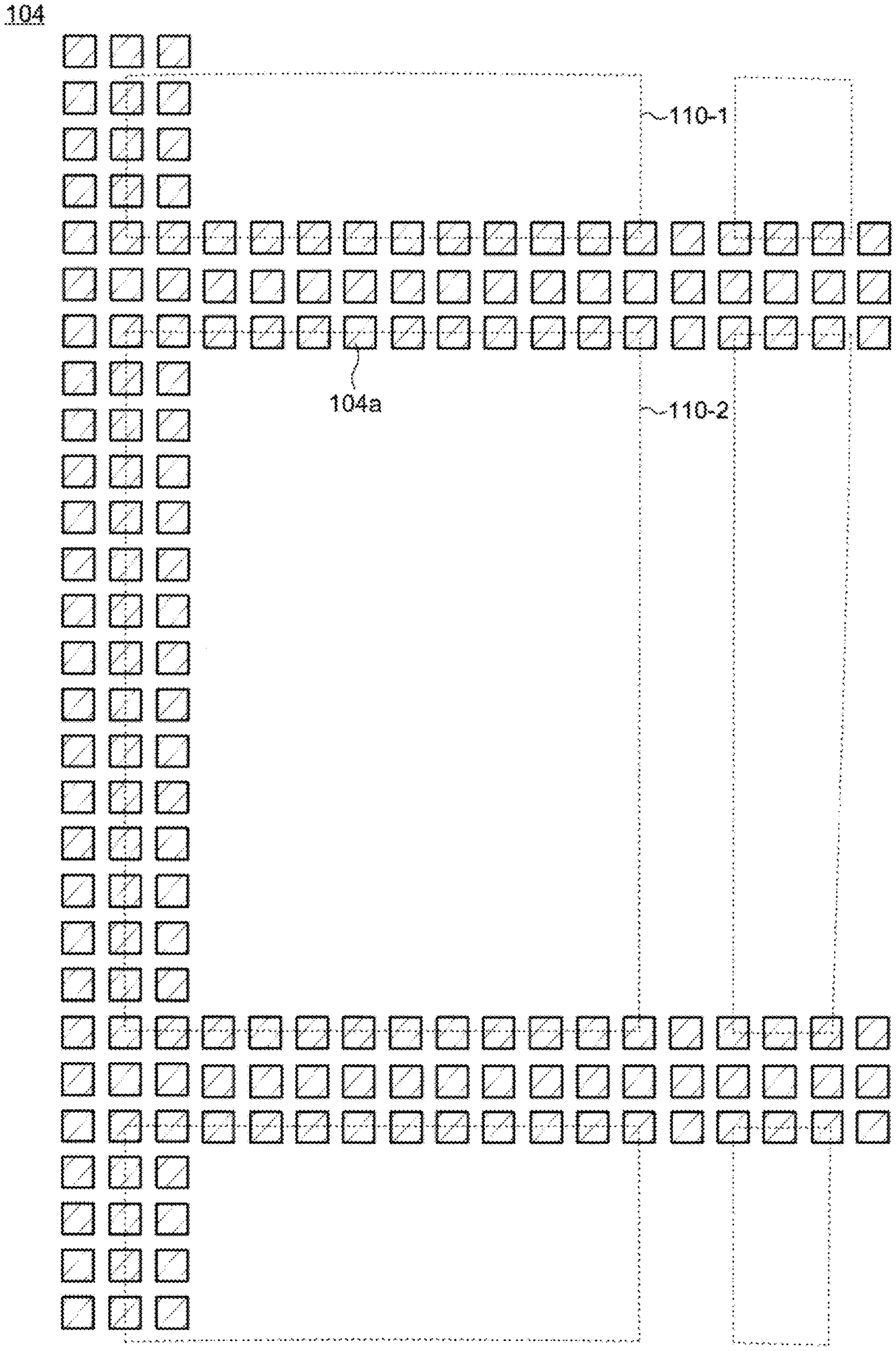
FIG. 8 is a schematic top view of a portion of an intelligent reflecting surface according to the present invention.

Alternatively, the anti-reflective film 104 may be structured with a plurality of conductive films containing a 0-valent metal such as titanium, tungsten, molybdenum, copper, and aluminum or a conductive oxide such as indium-tin oxide (ITO) and indium-zinc oxide (IZO) and arranged in an island shape. For example, the anti-reflective film 104 may be fabricated by arranging a plurality of conductive films 104*a* with a square or a substantially square planar island shape as shown in FIG. 8. In this case, the plurality of conductive films 104*a* may be arranged to form a plurality of lines parallel to the extending direction of a frame 104*b* in each frame 104*b* forming the lattice shape (see FIG. 7). The thickness of each conductive film 104*a* may be appropriately determined and may be selected from a range equal to or greater than 10 nm and equal to or less 500 nm, for example. The pitch of the conductive films 104*a* may be appropriately determined according to the wavelength of the incident radio waves and may be selected from a range equal to or greater than 100 μm and equal to or less than 500 μm, for example. The conductive film 104*a* may be formed by a dry deposition method such as sputtering method, an evaporation method, and a CVD method or by utilizing a wet deposition method such as a printing method and an inkjet method.

Figure 9A:
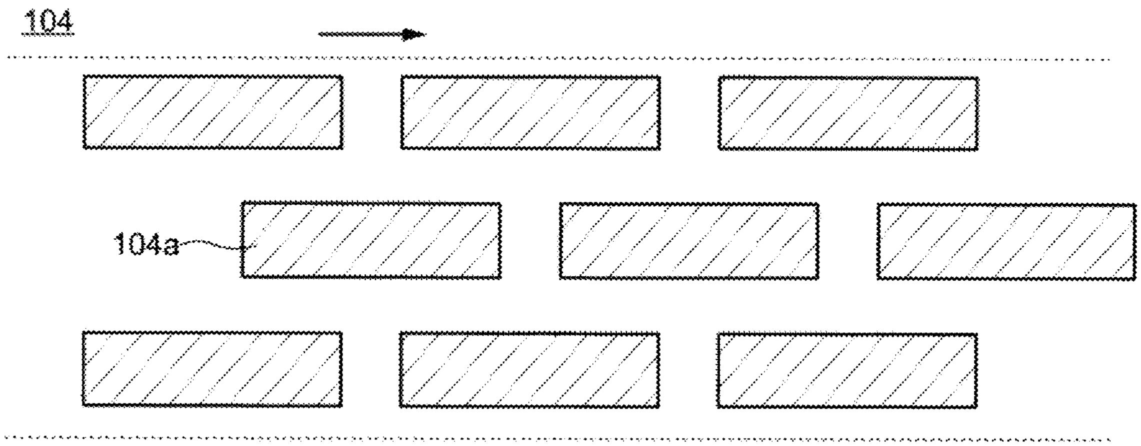
FIG. 9A is a schematic top view of an anti-reflective film included in an intelligent reflecting surface according to the present invention.
Figure 9B:
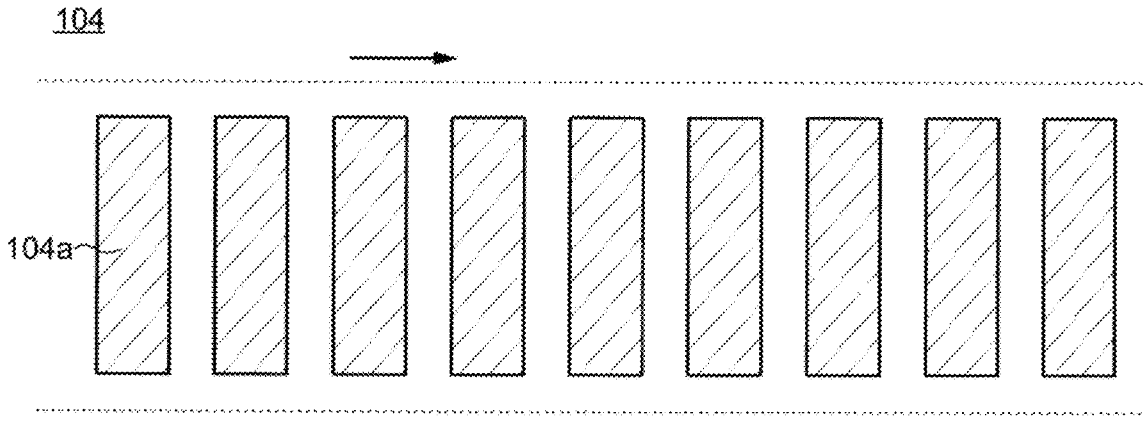
FIG. 9B is a schematic top view of an anti-reflective film included in an intelligent reflecting surface according to the present invention.

There is no restriction on the shape of each conductive film 104*a*, and each conductive film 104*a* may have, for example, a rectangular shape as shown in FIG. 9A and FIG. 9B. In this case, the longitudinal direction of each conductive film 104*a* may be parallel (FIG. 9A) or perpendicular (FIG. 9B) to the direction in which the frame 104*b* extends (indicated by the arrow in the drawing) or may be inclined from the direction in which the frame 104*b* extends although not illustrated. The plurality of conductive films 104*a* may also form a plurality of lines in the direction in which the frame 104*b* extends as shown in FIG. 9A or may form a single line as shown in FIG. 9B. In the former case, the plurality of conductive films 104*a* may exist in a staggered configuration.

Figure 9C:
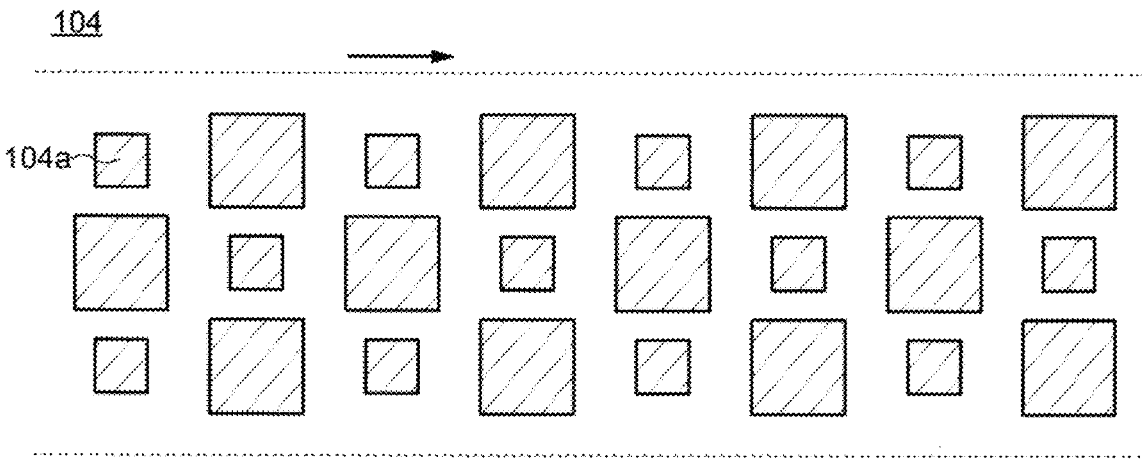
FIG. 9C is a schematic top view of an anti-reflective film included in an intelligent reflecting surface according to the present invention.

The shape or the size of the plurality of conductive films 104*a* may be identical to each other, or the anti-reflective film 104 may be composed of a plurality of conductive films 104*a* having different shapes or sizes as shown in FIG. 9C. In other words, two conductive films 104*a* selected from the plurality of conductive films 104*a* may differ from each other in shape or size.

Figure 10A:
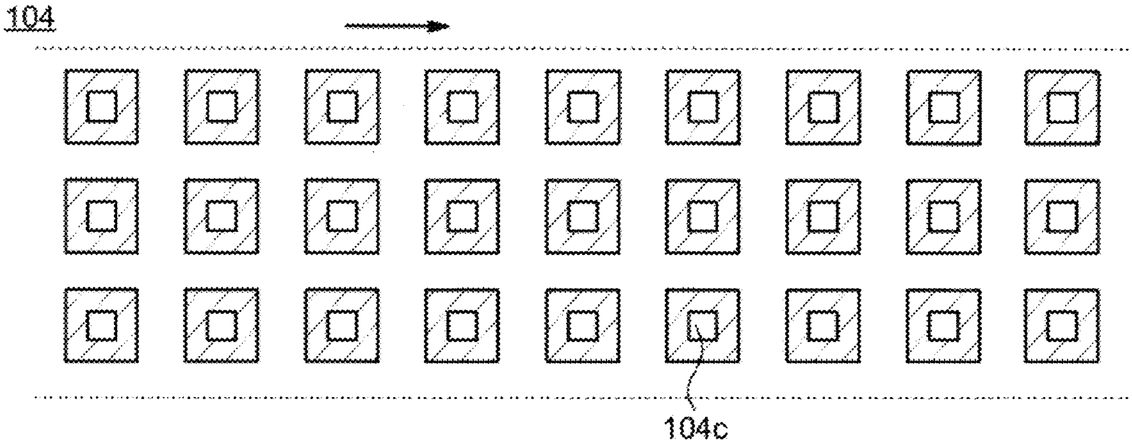
FIG. 10A is a schematic top view of an anti-reflective film included in an intelligent reflecting surface according to the present invention.
Figure 10B:
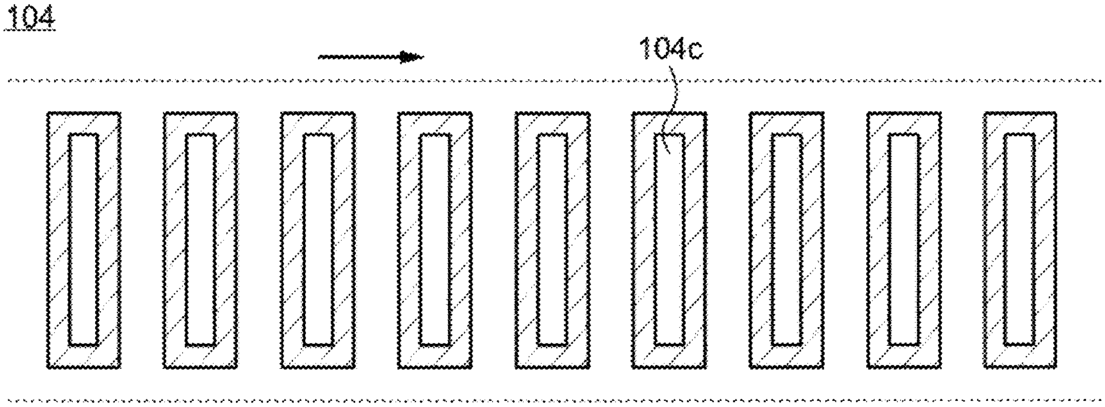
FIG. 10B is a schematic top view of an anti-reflective film included in an intelligent reflecting surface according to the present invention.
Figure 10C:
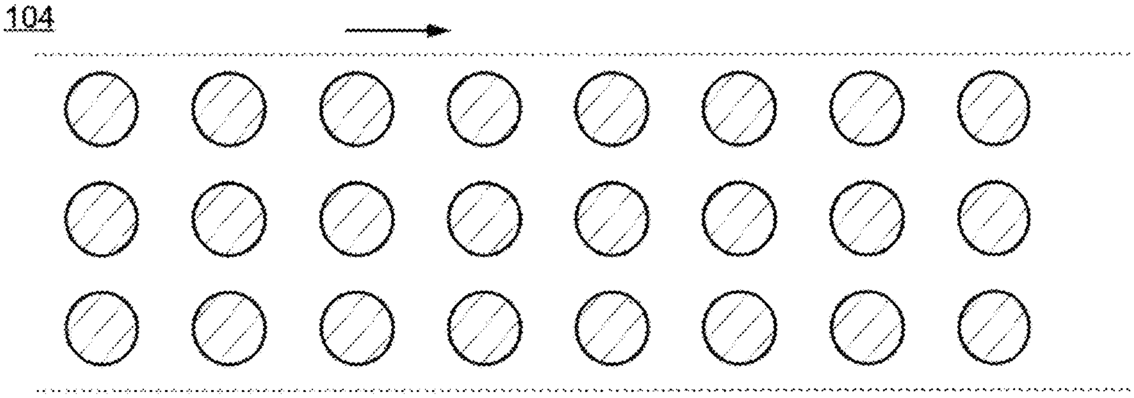
FIG. 10C is a schematic top view of an anti-reflective film included in an intelligent reflecting surface according to the present invention.

Alternatively, as shown in FIG. 10A and FIG. 10B, each conductive film 104*a* may have an opening 104*c*. The shape of the opening 104*c* may be similar to or different from the outer contour of the conductive film 104*a*. The shape of the opening 104*c* may be polygonal or may be a shape such as a circle and an ellipse having a curve in its contour. Alternatively, the conductive film 104*a* may be circular in shape or may have a shape such as an ellipse including a curve in its contour as shown in FIG. 10C, although not illustrated.

As described above, the formation of the anti-reflective film 104 with the plurality of conductive films 104*a* allows the radio waves incident on the anti-reflective film 104 to be reflected between the plurality of conductive films 104*a* and within the opening 104*c*, by which the radio waves interfere with one another and are attenuated. As a result, the radio waves are absorbed by the anti-reflective film 104. In this way, the formation of the anti-reflective film 104 suppresses the reflection of the radio waves between adjacent radio-wave reflecting devices 110.

Figure 11:
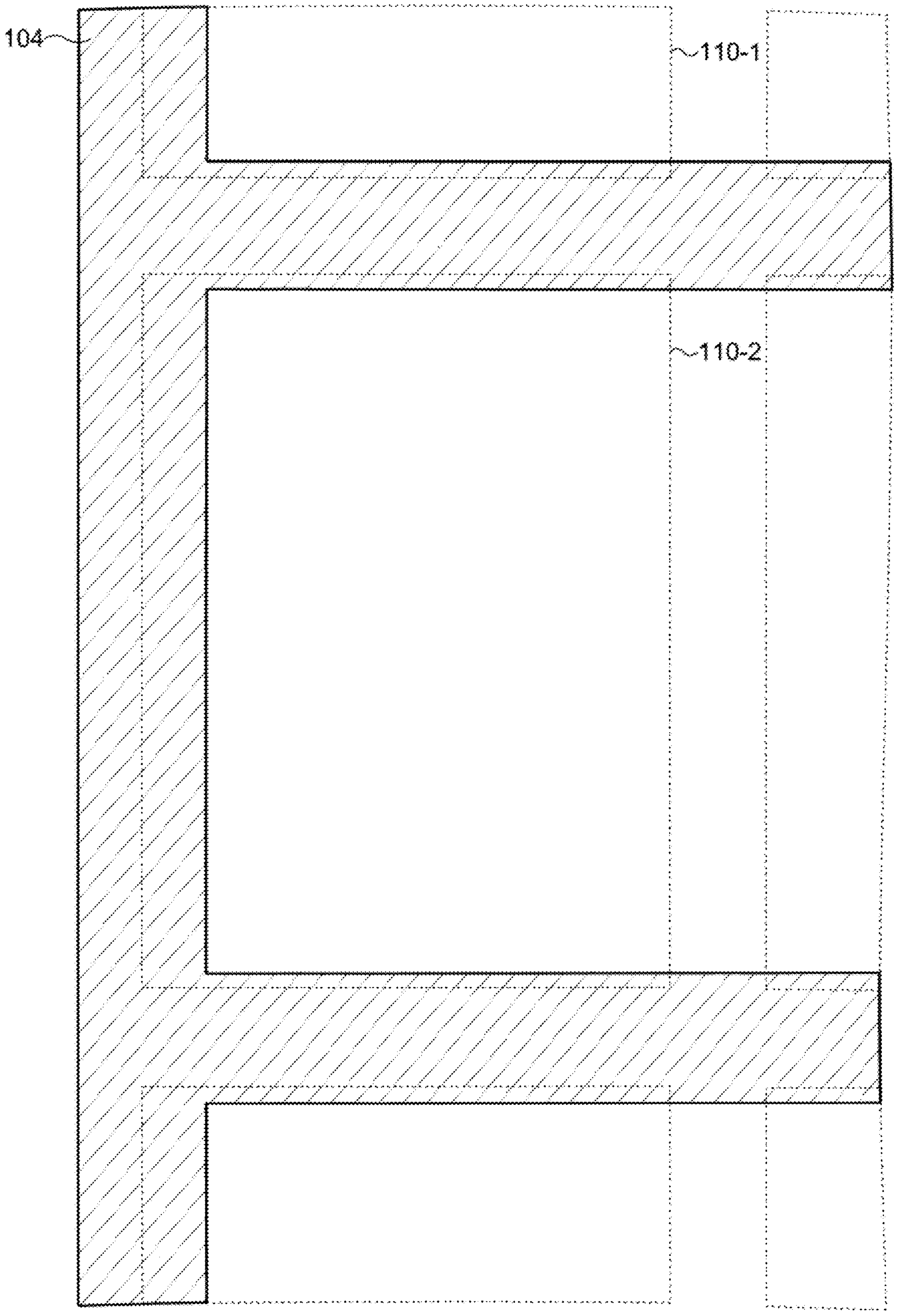
FIG. 11 is a schematic top view of a portion of an intelligent reflecting surface according to the present invention.
Figure 12A:
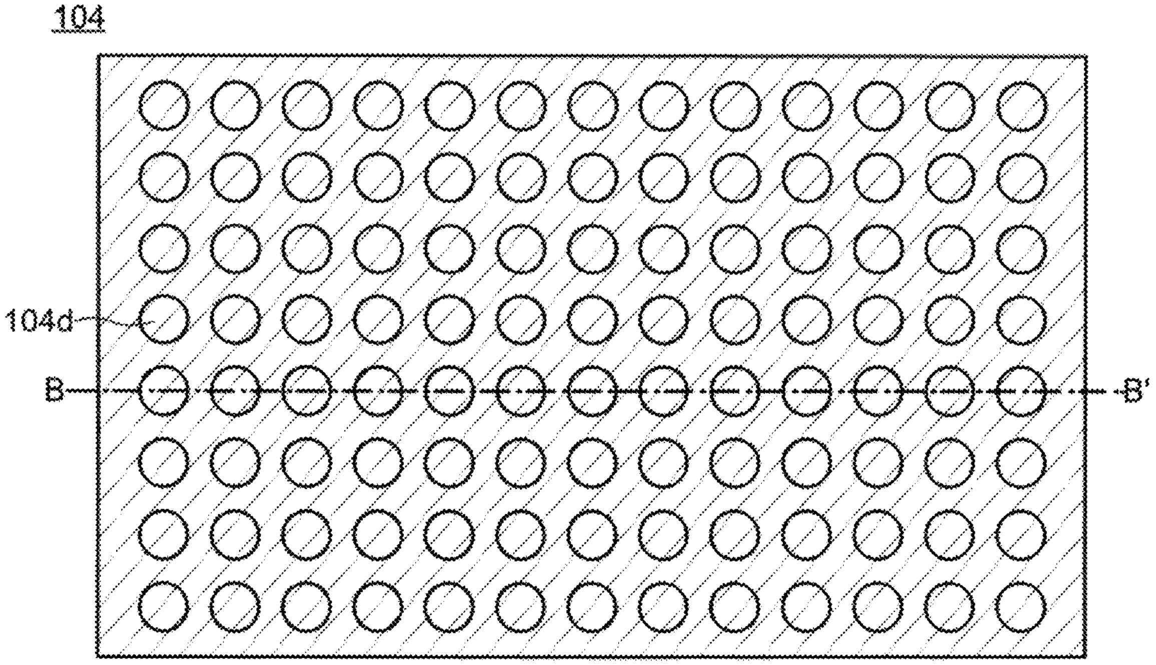
FIG. 12A is a schematic top view of an anti-reflecting film included in an intelligent reflecting surface according to the present invention.
Figure 12B:
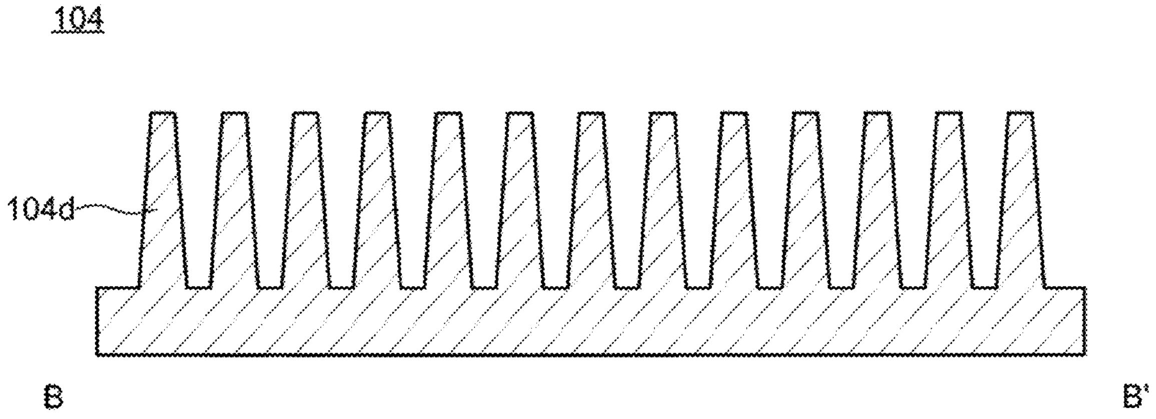
FIG. 12B is a schematic cross-sectional view of an anti-reflecting film included in an intelligent reflecting surface according to the present invention.

Alternatively, as shown in FIG. 11, its enlarged drawing, i.e., FIG. 12A, and a schematic view of a cross section along the chain line B-B' in FIG. 12A (FIG. 12B), the anti-reflective film 104 may be formed as a continuous film, and a plurality of protrusions 104*d* called a moth-eye structure may be fabricated on its upper surface. The height, the width, and the pitch of the protrusions 104*d* may be selected according to the wavelength of the radio waves incident on the intelligent reflecting surface 100. The radio waves incident on the anti-reflective film 104 are repeatedly reflected on the surface of the protrusions 104*d* of the moth-eye structure, and the reflected and incident radio waves interfere with each other to be attenuated. As a result, the radio wave reflections between adjacent radio-wave reflecting devices 110 can be suppressed.

Figure 13A:
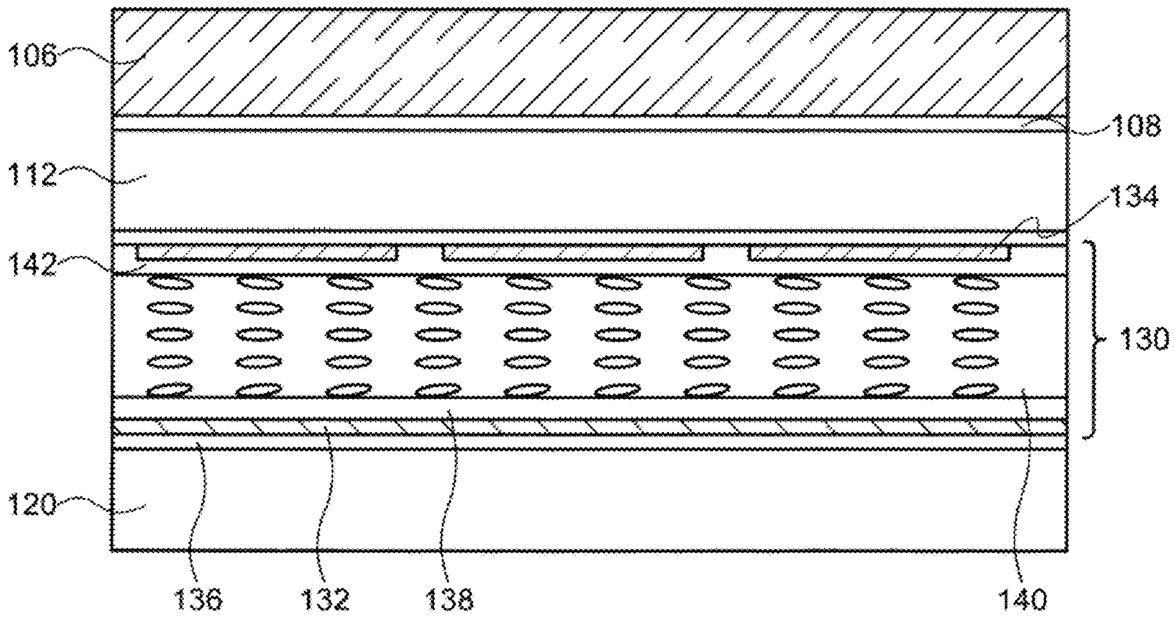
FIG. 13A is a schematic cross-sectional view of a radio-wave reflecting element included in an intelligent reflecting surface according to the present invention.
Figure 13B:
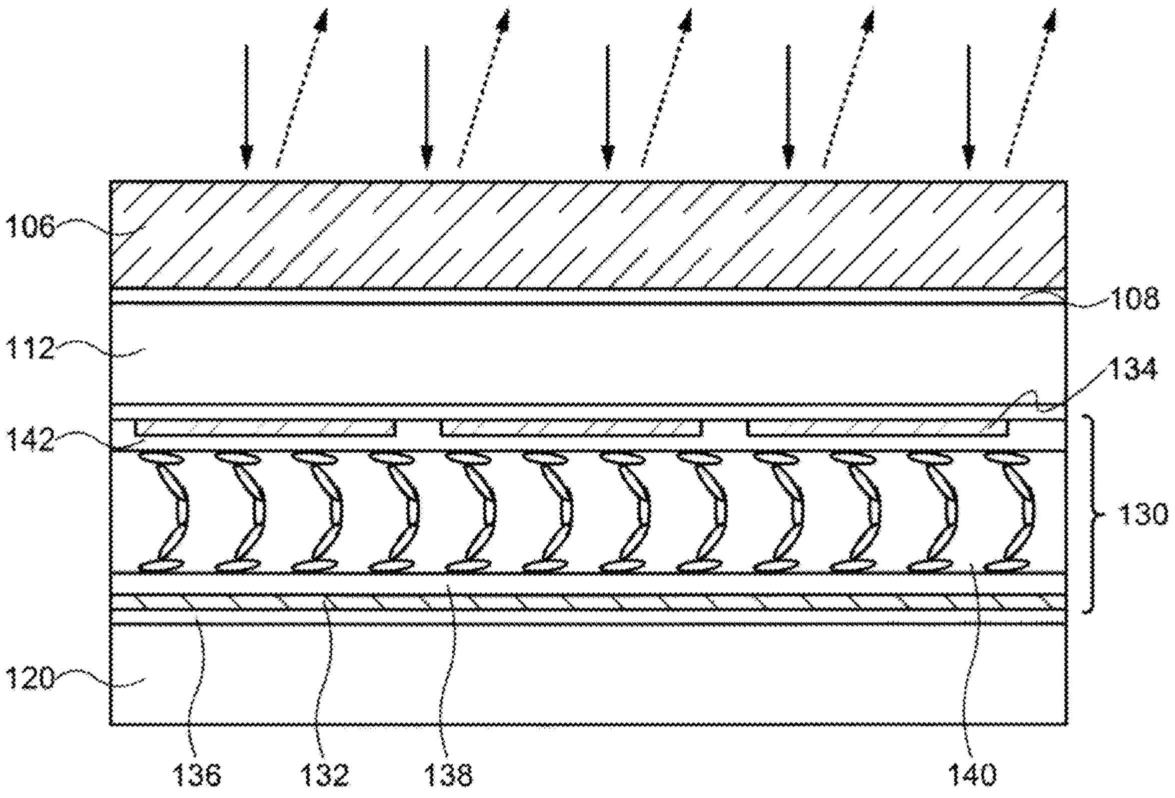
FIG. 13B is a schematic cross-sectional view of a radio-wave reflecting element included in an intelligent reflecting surface according to the present invention.

In the radio-wave reflecting device 110 having the aforementioned structure, the liquid crystal molecules are splay-oriented as described above (FIG. 13A) when no potential difference is provided between the first electrode 132 and the second 134 electrode. On the other hand, when a potential difference is provided between the first electrode 132 and the second 134 electrode, the liquid crystal molecules rise (FIG. 13B). When the dielectric constant of the liquid crystal layer 140 changes due to the rising of the liquid crystal molecules, the reflected waves (see dotted arrows in FIG. 13B) generated by the reflection on the surface of the first electrode 132 changes in phase with respect to the incident radio waves (see the solid arrows in FIG. 13B.). As a result, the travelling direction of the radio waves changes. That is, it is possible to reflect radio waves at a reflection angle different from the incident angle of the radio waves. For example, the incident angle of the radio wave is 0°, but the reflection angle is greater than 0° in the examples shown in FIG. 13A and FIG. 13B. The reflection angle is determined by the amount of phase change of the reflected waves, and the amount of phase change of the reflected waves can be controlled by the potential difference between the first electrode 132 and the second 134 electrode. Therefore, the radio-wave reflecting device 110 functions as an intelligent reflecting surface capable of reflecting radio waves in arbitral directions.

Figure 14A:
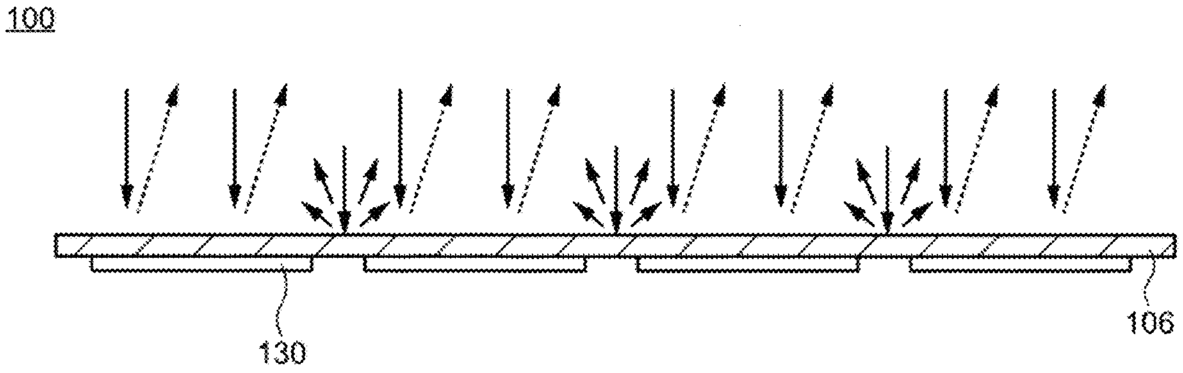
FIG. 14A is a schematic view for explaining reflection of radio waves at an intelligent reflecting surface including a plurality of radio-wave reflecting devices according to the present invention.

Since the intelligent reflecting surface 100 according to an embodiment of the present invention includes the plurality of radio-wave reflecting devices 110, it can be used as a large-size intelligent reflecting surface. However, since there are no radio-wave reflecting elements 130 between adjacent radio-wave reflecting devices 110, radio waves cannot be reflected in arbitral directions between adjacent radio-wave reflecting devices 110. In addition, since not only the side surfaces of the first substrate 120 and the second substrate 112 but also parts such as the connectors 116 exist between adjacent radio-wave reflecting devices 110, radio waves are reflected in complex ways and are diffusely reflected in unintended directions (see the diagonal solid arrows in FIG. 14A). Such phenomena may cause radio interference.

Figure 14B:
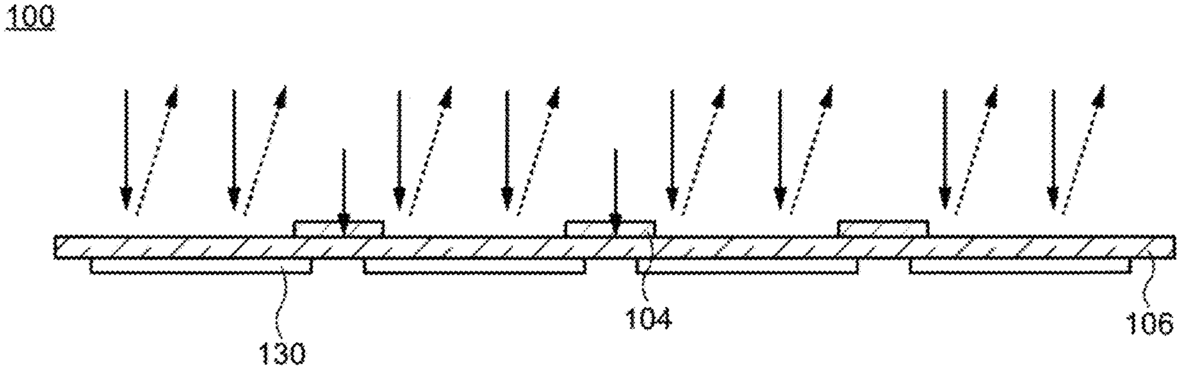
FIG. 14B is a schematic view for explaining reflection of radio waves at an intelligent reflecting surface according to the present invention.

However, adjacent radio-wave reflecting devices 110 are provided with the anti-reflective film 104 in the intelligent reflecting surface 100 as described above, by which the radio waves incident between adjacent radio-wave reflecting devices 110 are absorbed. As a result, not only can radio waves be selectively reflected and provided in a desired direction at the portion exposed from the anti-reflective film 104 of each radio-wave reflecting device 110 (see the dotted arrows in FIG. 14A and FIG. 14B), the intensity of the radio waves diffusely reflected between adjacent radio-wave reflecting devices 110 can also be significantly reduced, thereby eliminating the factor of the radio wave interference.

(3) Modified Examples of Radio-Wave Reflecting Element

Figure 15:
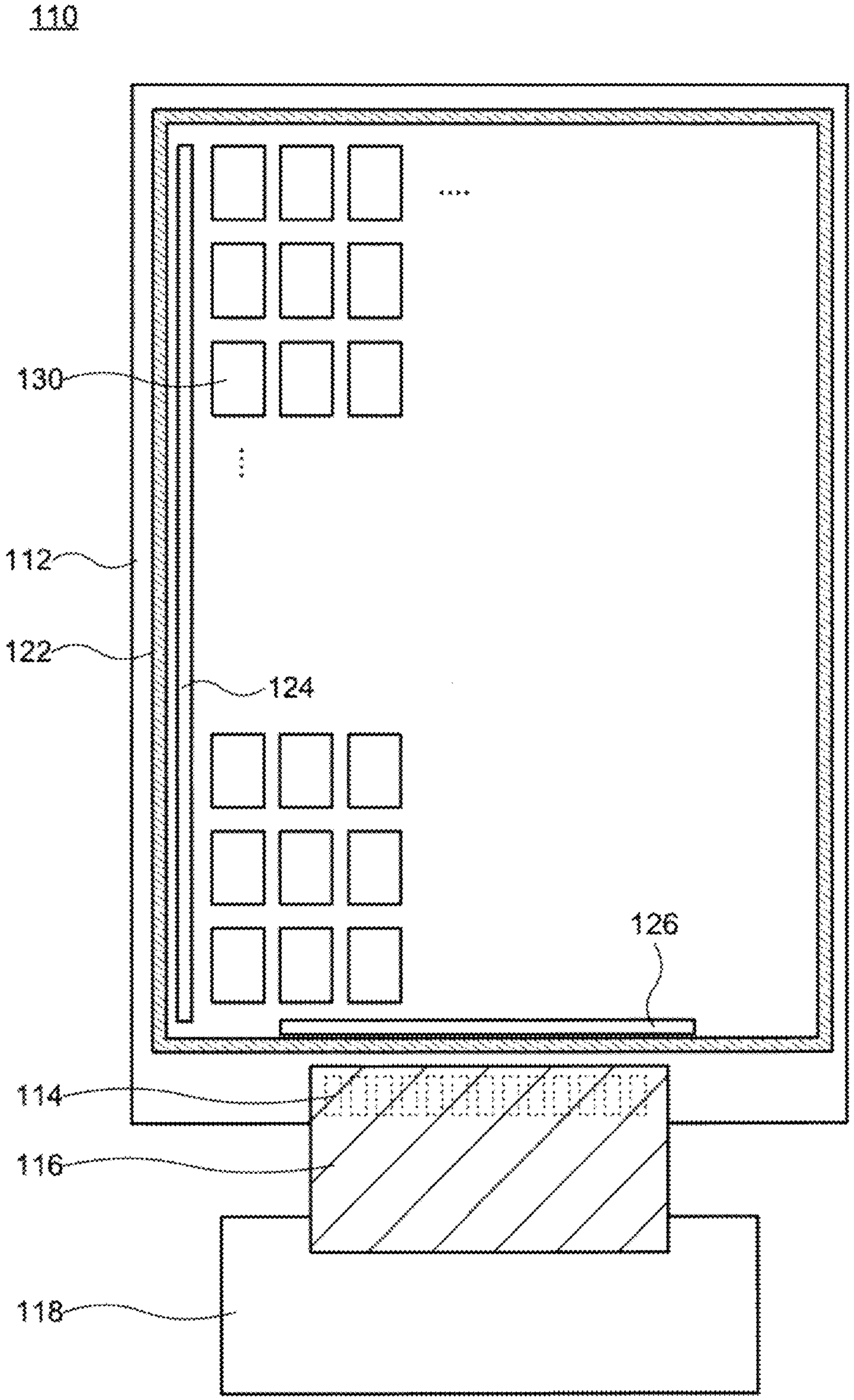
FIG. 15 is a schematic bottom view of a radio-wave reflecting element of a radio-wave reflecting device included in an intelligent reflecting surface according to the present invention.

The configuration of the radio-wave reflecting element 130 included in the plurality of radio-wave reflecting devices 110 structuring the intelligent reflecting surface 100 is not limited to the configuration described above. For example, the radio-wave reflecting device 110 may be configured so that the second electrodes are not independently controlled every row or column but are independently controlled between radio-wave reflecting elements 130. In this case, two driver circuits (gate-line driver circuit 124 and signal-line driver circuit 126) for controlling the plurality of radio-wave reflecting elements 130 may be provided, for example, over a surface of the second substrate 112 on the first substrate 120 side as shown in a schematic bottom view in FIG. 15. A plurality of gate wirings which is not illustrated extends in the row direction from the gate line driver circuit 124. The gate-line driver circuit 124 generates gate signals on the basis of the signals provided from the driver circuit over the printed circuit board 118 through the connector 116 and supplies them to the plurality of radio-wave reflecting elements 130 connected to each gate wiring. Meanwhile, signal lines which are not illustrated extend from the signal-line driver circuit 126 in the column direction. The signal-line driver circuit 126 generates control potentials on the basis of the signals provided from the driver circuit over the printed circuit board 118 through the connector 118 and supplies them to the plurality of radio-wave reflecting elements 130 connected to each signal line. Note that the gate-line driver circuit 124 and the signal-line driver circuit 126 may be fabricated with metal films, insulating films, and semiconductor films formed on the second substrate 112 side of the first substrate 120 or may be fabricated by mounting an IC chip having an integrated circuit formed over a semiconductor substrate on the second substrate 112 side of the first substrate 120. There is no restriction on the number of gate-line driver circuits 124, and a pair of gate-line driver circuits 124 may be provided to sandwich the reflective region, for example.

Figure 16:
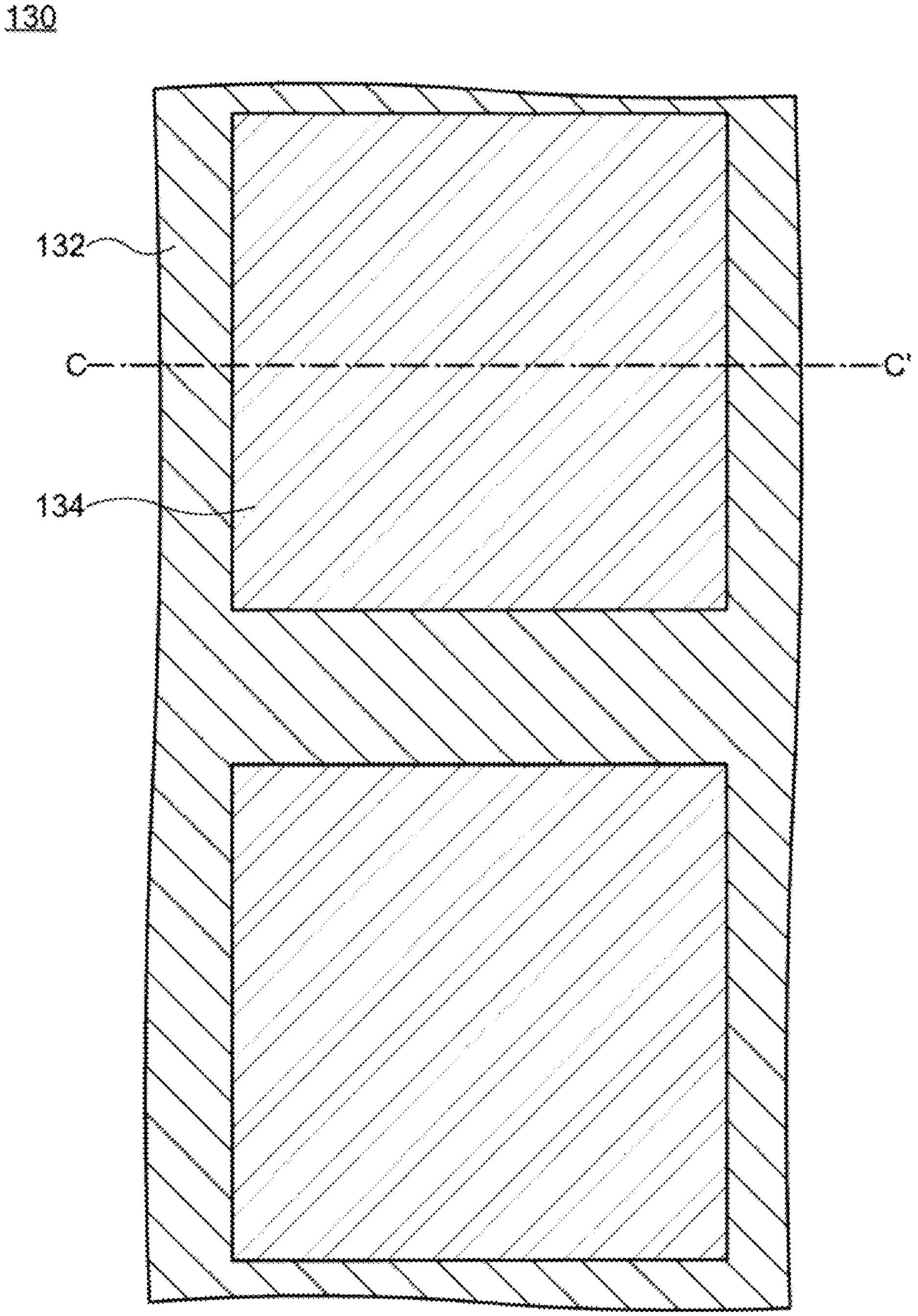
FIG. 16 is a schematic top view of a radio-wave reflecting element of a radio-wave reflecting device included in an intelligent reflecting surface according to the present invention.
Figure 17:
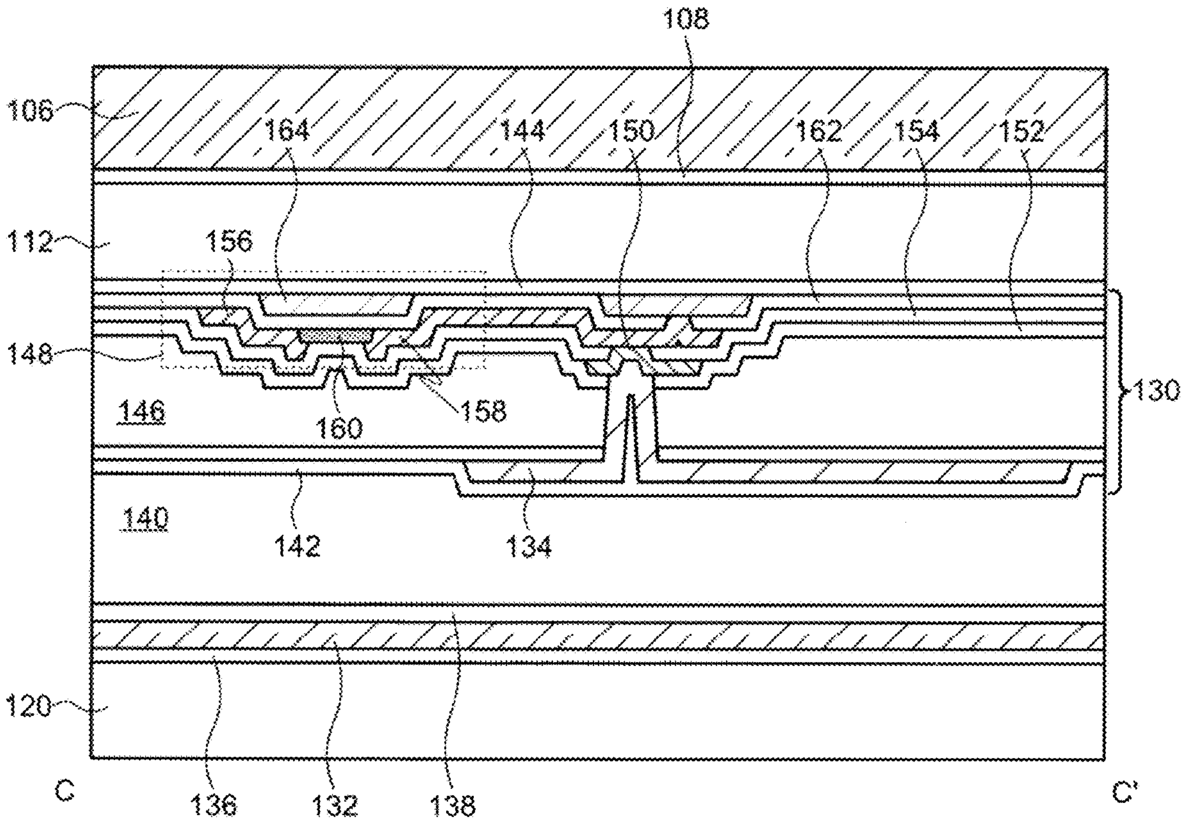
FIG. 17 is a schematic cross-sectional view of a radio-wave reflecting element of a radio-wave reflecting device included in an intelligent reflecting surface according to the present invention.

A schematic top view of two adjacent radio-wave reflecting elements 130 is shown in FIG. 16, and a schematic view of a cross section along the chain line C-C' in FIG. 16 is shown in FIG. 17. As shown in FIG. 17, a transistor 148 is provided on the first substrate 120 side of the second substrate 112 either directly or through the protective film 144. The transistor 148 illustrated in FIG. 17 is a so-called bottom-gate transistor and has a gate electrode 164, a gate insulating film 162 covering the gate electrode 164, a semiconductor film 160 overlapping the gate electrode 164 through the gate insulating film 162, and a first terminal 156 and a second terminal 158 electrically connected to the semiconductor film 160. There is no restriction on the structure of the transistor 148, and the transistor 148 may be a top-gate transistor or a dual-gate transistor having gate electrodes 164 over and under the semiconductor film 160. There is also no restriction on the vertical relationship between the first terminal 156 and the semiconductor film 160 and between the second terminal 158 and the semiconductor film 160. The semiconductor film 160 may contain a Group 14 element such as silicon or an oxide semiconductor such as indium-gallium oxide and indium-gallium-zinc oxide.

A first interlayer insulating film 154 composed of one or a plurality of films including silicon oxide or silicon nitride is provided so as to overlap the first terminal 156 and the second terminal 158, and a connection pad 150 having conductivity is electrically connected to the second terminal 158 through an opening formed in the first interlayer insulating film 154. A planarization film 146 for absorbing unevenness caused by the transistor 148 or the like and providing a flat surface is disposed over the connection pad 150 directly or through a second interlayer insulating film 152 so as to cover the connection pad 150. An opening is formed in the planarization film 146 and the second interlayer insulating film 152 to expose the connection pad 150, and the second electrode 134 located under the planarization film 146 is electrically connected to the connection pad 150 through this opening. As an optional component, a third interlayer insulating film which is not illustrated may be formed between the planarization film 146 and the first electrode 132. Although not illustrated, one or a plurality of additional transistors and capacitive elements may be arranged in each radio-wave reflecting element 130 in addition to the transistor 148.

In the aforementioned configuration, the transistor 148 is fabricated over a surface of the second substrate 112 on the first substrate 120 side, and the liquid crystal layer 140 located on the side of the first substrate 120 of the transistor 148 is controlled. However, the transistor 148 and other elements may be fabricated on a surface of the first substrate 120 on the second substrate 112 side, and the liquid crystal layer 140 located thereover may be controlled.

The on-off of the transistor 148 is controlled by the signals supplied through the gate wiring. When the transistor 148 is on, the control potential supplied through the signal line is provided to the second electrode 134 through the transistor 148. Therefore, the control potential can be individually supplied to each of the radio-wave reflecting elements 130. On the other hand, the first electrode 132 is supplied with a potential (common potential) commonly provided to the plurality of radio-wave reflecting elements 130. The difference between this common potential and the control potential generates an electric field between the first electrode 132 and the second electrode 134, and the dielectric constant of the liquid crystal layer 140 is controlled for each radio-wave reflecting element 130.

The aforementioned modes described as the embodiments of the present invention can be implemented by appropriately combining with each other as long as no contradiction is caused. Furthermore, any mode which is realized by persons ordinarily skilled in the art through the appropriate addition, deletion, or design change of elements or through the addition, deletion, or condition change of a process on the basis of the radio-wave reflecting elements or the intelligent reflecting surfaces is included in the scope of the present invention as long as they possess the concept of the present invention.

It is understood that another effect different from that provided by each of the aforementioned embodiments is achieved by the present invention if the effect is obvious from the description in the specification or readily conceived by persons ordinarily skilled in the art.

What is claimed is:

1. An intelligent reflecting surface comprising:

a plurality of radio-wave reflecting devices;

an adjusting substrate over the plurality of radio-wave reflecting devices; and an anti-reflective film located over the adjusting substrate and configured to absorb radio waves, wherein each of the plurality of radio-wave reflecting devices comprises:

a pair of substrates; and a plurality of radio-wave reflecting elements between the pair of substrates, the anti-reflective film has a lattice shape as a whole, and an edge is covered by the anti-reflective film and a portion surrounded by the edge is exposed from the anti-reflective film in each of the plurality of radio-wave reflecting devices.

2. The intelligent reflecting surface according to claim 1, wherein a frequency of the radio waves is equal to or greater than 400 MHz and equal to or less than 50 GHz.

3. The intelligent reflecting surface according to claim 1, further comprising an adhesive layer between the plurality of radio-wave reflecting devices and the adjusting substrate, wherein a summation of optical distances of one of the pair of substrates closer to the adjusting substrate, the adhesive layer, and the adjusting substrate is ¼±20% of a wavelength of the radio waves.

4. The intelligent reflecting surface according to claim 1, wherein the anti-reflective film contains a conductive oxide or a 0-valent metal.

5. The intelligent reflecting surface according to claim 1, wherein the anti-reflective film comprises a plurality of conductive films arranged in an island shape.

6. The intelligent reflecting surface according to claim 5, wherein the plurality of conductive films has the same shape in a plane view.

7. The intelligent reflecting surface according to claim 5, wherein one of the plurality of conductive films is different in shape from another one of the plurality of conductive films.

8. The intelligent reflecting surface according to claim 5, wherein a shape of the plurality of conductive films is a polygon, a circle, or an ellipse in a plane view.

9. The intelligent reflecting surface according to claim 5, wherein the lattice shape comprises a plurality of linear frames, and the plurality of conductive films is arranged in a plurality of rows along an extending direction of the frame in each of the plurality of linear frames.

10. The intelligent reflecting surface according to claim 9, wherein the plurality of conductive films is staggered.

11. The intelligent reflecting surface according to claim 1, wherein the anti-reflective film is a single continuous film having a plurality of openings overlapping the portion.

12. The intelligent reflecting surface according to claim 11, wherein an upper surface of the anti-reflective film has a moth-eye structure.

13. The intelligent reflecting surface according to claim 12, wherein the moth-eye structure is structured by a plurality of protrusions.

14. The intelligent reflecting surface according to claim 1, wherein each of the radio-wave reflecting elements comprises:

a first electrode;

a first orientation film over the first electrode;

a liquid crystal layer over the first orientation film;

a second orientation film over the liquid crystal layer; and a second electrode over the second orientation film.

15. The intelligent reflecting surface according to claim 14, wherein each of the plurality of radio-wave reflecting elements further comprises a transistor electrically connected to the first electrode or the second electrode.

* * * * *